# 3,271,470
DIMERIZATION METHOD

Sydney P. Spence, Westfield, Ulrich A. Steiner, North Plainfield, Larry Madestau, Martinsville, Robert E. Richardson, Newark, and Stephen Kaufman, East Brunswick, N.J., assignors to Union Carbide Corporation, a corporation of New York
No Drawing. Filed June 22, 1964, Ser. No. 377,133
14 Claims. (Cl. 260—670)

This invention relates to the preparation of a dimeric precursor of the p-xylylene polymer family. More specifically, this invention provides a method for the production of the cyclic dimer, di-p-xylylene, in high yield and efficiency.

Polymers of the p-xylylene family constitute a new family of polymers which have been found to be highly desirable materials due to their unusual combination of thermal and chemical properties. Various methods of producing these polymers have been developed, however, the most efficient method entails the pyrolytic conversion of the cyclic dimer, di-p-xylylene, to the polymer. By this method truly linear poly-p-xylylenes, free of cross-linking, are produced in high yield without interference from the formation of side products.

The cyclic dimer, di-p-xylylene (DPX) is however, a sterically hindered and strained molecule which is produced by the pyrolytic decomposition of p-xylene at temperatures of from about 800° C. to 1000° C. The pyrolytic decomposition of p-xylene is capable of giving rise to the formation of a large number of possible decomposition products. For this reason, it is necessary to employ production methods which promote reaction specificity in order to obtain a useful raw material efficiency.

The conversion of p-xylene to the cyclic dimer is essentially a multi-step reaction. The primary reaction involves the loss of a single hydrogen atom from p-xylene to yield a p-xylyl mono-radical:

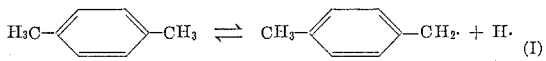
(I)

This first step is observable at temperatures of about 800° C., and the rate approximately doubles for each 20° C. rise.

The desired secondary reaction involves the conversion of p-xylyl monoradicals into p-xylylene diradicals. This is believed to occur through disproportionation of a pair of p-xylyl monoradicals to a molecule of p-xylene and a p-xylylene diradical, respectively, as follows:

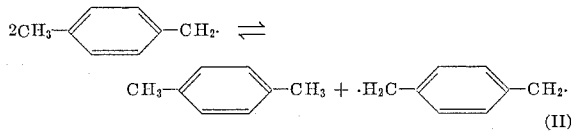
(II)

The equilibrium is shifted in favor of the formation of p-xylylene diradicals at temperatures of from 900° C. to 1000° C. A secondary side reaction of some prominence is the combination of two p-xylyl monoradicals to form the liner dimer, di-p-tolyl-ethane:

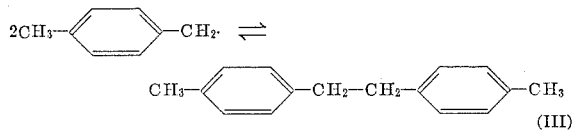
(III)

At temperatures below about 900° C., and especially at temperatures between about 450° C. to about 800° C. the equilibrium is shifted in favor of the formation of the linear dimer.

In operation, the temperature dependency of the equilibrium can be taken advantage of to substantially minimize the presence of other related side products such as toluene, benzene, cyclic tri-p-xylylene, 4,4'-dimethylstilbene, 2,6-dimethylanthracene, and the like in the effluent stream from the pyrolytic reactor.

The p-xylylene diradicals formed as shown in Equation II above, if cooled to temperatures below about 350° C., condense and simultaneously polymerize upon contacting a non-wetted substrate surface or a non-solvent for said diradicals such as water to form a p-xylylene polymer:

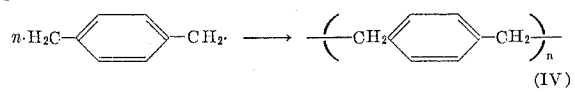
(IV)

If, however, the p-xylylene diradicals are condensed in the presence of a fluid medium of an inert organic solvent for said diradicals, dimerization of the diradicals to the cyclic dimer, di-p-xylylene, occurs:

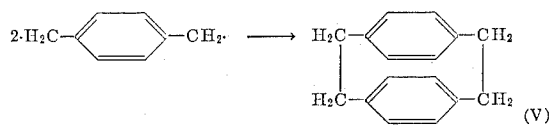
(V)

Accordingly, it is an object of this invention to provide a method for the dimerization of p-xylylene diradicals into the cyclic dimer, di-p-xylylene in high yields and efficiencies. Moreover, it is another object of this invention to enable the commercial recovery of di-p-xylylene in high purity by substantially minimizing the formation of interfering byproducts.

The present invention provides a method for the preparation of cyclic di-p-xylylene which comprises:

(a) cooling a stream containing steam and p-xylylene radicals to a temperature between about 450° C. and about 800° C.;

(b) thermally and physically isolating said stream from non-wetted surfaces maintained at temperatures below about 350° C.;

(c) absorbing a substantial portion of the p-xylylene diradicals from said stream by contacting said stream in a first spray zone with a spray of a quench liquor containing a solvent for the p-xylylene diradicals, wherein said diradicals can dimerize to the cyclic dimer, di-p-xylylene, said quench liquor maintained at a temperature above the condensation temperature of the steam in said stream;

(d) desuperheating said stream in said first zone by contacting said stream with said spray of quench liquor and vaporizing a portion of said quench liquor spray without excessive reduction of spray volume;

(e) further contacting the effluent from said first spray zone with a fine spray of said quench liquor in a second spray zone, said quench liquor maintained at a temperature above the condensation temperature of the steam in said stream under conditions sufficient to remove substantially all of the residual p-xylylene diradicals from said stream;

(f) maintaining all surfaces in said first and second spray zones wet with said quench liquor;

(g) separating the quench liquor from the effluent from said second spray zone and recovering the cyclic di-p-xylylene from said quench liquor.

The steam-diluted pyrolysis of p-xylene at temperatures of from about 800° C. to 1000° C. and preferably at temperatures of from 950° C. to 1000° C., results in an effluent stream emerging from the pyrolysis zone containing principally steam and p-xylylene diradicals, i.e., p-xylyl monoradicals and p-xylylene diradicals.

It has now been found that rapidly cooling the pyrolysate stream from 800° C.–1000° C. to less than about 800° C. and preferably to between about 450° C.–800° C. results in a shift in the equilibrium which exists between the p-xylyl monoradicals and the linear dimer, di-p-tolyl ethane (Equation III) favoring the formation of the linear dimer. It has also been found that this rapid cooling stabilizes the p-xylylene diradicals. Rapid cooling can be conveniently accomplished by injecting a fine spray of low quality steam, preferably at about 100° C., into the pyrolysate stream to provide the desired temperature drop preferably within about 10 milliseconds. Tying up the residual monoradicals as linear dimers prevents the formation of interfering side products. The linear dimer is soluble in the quench liquor subsequently employed and does not present a recovery problem.

A major problem which has heretofore existed has been the transfer of the pyrolysate stream containing the p-xylylene diradicals which are prone to condense and polymerize on any non-wetted surface maintained below about 350° C. from the pyrolytic reactor to the subsequent quench tower. The term "non-wetted surface" as used herein is meant to include any solid surface such as pipe walls, nozzles, reactor linings, quench tower walls and the like as well as the surface of any non-solvent for the reactive diradical such as water. The pyrolysis zone and subsequent transfer line, although presenting non-wetted surfaces, are maintained at temperatures above about 350° C. thereby presenting no problem of condensation and polymerization. In the subsequent quenching zone, however, the quench tower walls are well below 350° C. thereby presenting a serious problem. The present invention, however, provides means for transferring the pyrolysate stream from the hot reaction conditions, i.e., above about 350° C., to the relatively cold, wetted conditions within the subsequent quench zone without polymerization and gradual plugging of lines and nozzles. This is accomplished by thermally and physically isolating said pyrolysate stream from any non-wetted surfaces maintained at temperatures below about 350° C. to prevent condensation and polymerization of the diradicals in said stream.

The transition can be accomplished by admitting the pyrolysate stream into the quench tower via a thermally isolated inlet conduit generally comprised of a conduit surrounded by a layer of thermal insulation. An annular shell connected to the terminal portion of said conduit serves as a thermal bridge across which the high temperature of the pyrolysate stream is transferred to an external heat sink. The pyrolysate stream upon leaving the inlet conduit is thereafter exposed to a continuous fluid film barrier which prevents condensation and polymerization on any non-wetted surfaces maintained at temperatures below about 350° C.

The transition zone can be, for example, comprised of a thermally isolated inlet conduit cooperating with a continuously wetted flared downcomer leading to the subsequent spray zones. The inlet conduit is comprised of two substantially concentric shells with a layer of thermal insulation therebetween. The "hot" inner shell is connected to the "cold" outer shell by an annular section at the terminal portion of said inlet which serves as a thermal bridge across which the high temperature of the pyrolysis stream is transferred to an external heat sink. The pyrolysate stream upon leaving the inlet conduit is exposed to a continuous liquid film barrier which prevents condensation of diradicals on any non-wetted surfaces maintained at temperatures below about 350° C. This is accomplished by passing said stream into a substantially flared or conical entrance to a downcomer which conveys the pyrolysate stream to the subsequent spray zones hereinafter discussed. The conical or flared inlet to the downcomer is irrigated with a constant flow of quench liquor forming a continuous liquid film barrier across the entire inner surface of said inlet to the downcomer in a manner similar to that of the familiar "dentist's bowl." It is considered critical, however, that the temperature of the quench liquor be sufficient to preclude condensation of steam from the pyrolysate stream. The wetter conical or flared inlet converges into a downcomer which conveys the pyrolysate stream, now surrounded by a continuous film of boiling quench liquor, to the subsequent spray zones. In order to prevent contact of the pyrolysis vapor with the cooler surface of the thermal bridge, a small flow of purge steam is employed to flush out the clearance between the wet and dry surfaces and which thereafter mixes with the pyrolysate stream. It is considered preferable to employ quench liquor which is substantially free from dissolved di-p-xylene as the irrigation medium in the transition zone in order to prevent deposition of the cyclic dimer or polymer formation.

Another means of providing the necessary transition of the pyrolysate stream into the spray zones without polymer formation is through use of a vaporous film barrier. For example, the inlet conduit can be thermally insulated as above, and connected to an external heat sink through an annular thermal bridge surrounding the insulation and connected to the inlet conduit at the terminal portion thereof. In place of the flared downcomer or "dentist's bowl" arrangement discussed above, a porous wall spaced from and disposed about said insulated inlet conduit can be employed. In order to prevent contact of the pyrolysate stream with the cooler non-wetted surface of the porous wall, a small flow of purge steam is employed to transpire through the pores in said wall forming a continuous vapor barrier film about the inner surface of said wall. The purge steam can thereafter mix with the pyrolysate stream and presents no recovery problem. It is also desirable to employ an orifice at the terminal portion of the inlet conduit to provide a reduced pressure zone about the pyrolysate stream issuing therefrom thereby providing a continual positive flow through the porous wall and away from the surface thereof. The use of such an orifice in the inlet conduit in the "dentist's bowl" arrangement discussed above is also considered beneficial. In addition, a screen mounted at the terminal portion of the transition zone prevents direct impingement of spray droplets from the immediately following spray zones thereby maintaining the terminal portion of said porous wall free of deposits.

The transition zone can also provide an elastic element in the recovery system to take up the thermal expansion of the pyrolysis vapor line. They can be conveniently accomplished through use of expansion bellows to join the transition zone to the subsequent spray tower.

Upon making the transition from the dry high temperature conditions of the pyrolysis zone to the wetted, cooler conditions which exist throughout the remainder of the recovery system, the pyrolysate stream is passed into a first spray zone wherein it is intimately contacted with a spray of quench liquor. The term "quench liquor" as used throughout this specification and claims is intended to denote an inert organic solvent for the p-xylylene diradicals such as p-xylene, o-xylene, m-xylene, toluene, cumene, benzene, methyl-naphthalene, o-dichlorobenzene, 1,2-di-p-tolyethane, diphenylmethane, heptane and the like. For simplification of the recovery process, however, p-xylene is most preferred.

The p-xylylene diradicals in the pyrolysate stream have to be absorbed and dispersed in the organic quench liquor to form the cyclic dimer, di-p-xylylene. Thus, by avoiding local high concentrations of diradicals, dimerization is favored over polymerization.

In the spray zones of the present invention, it has been found critical to avoid the formation of water, a non-solvent for p-xylylene diradicals, by the condensation of steam. The condensing steam can envelope the p-xylene droplets of the spray and hinder the absorption of the p-xylylene diradicals and lead to the undesirable formation of polymer. It has been found in this invention that the accumulation of water in the p-xylene quench liquor can be prevented provided the quench liquor temperature is maintained at least above the dew point of the p-xylene-water azeotrope which is 94° C. and preferably by maintaining the temperature of the quench liquor above that which would enable steam to condense at the pressure within the system. As a result, the quench liquor is comprised of a homogeneous p-xylene phase with small amounts, i.e., less than about 0.5% of dissolved water. In this manner the dissolved water does not impede the absorption of the diradicals. Moreover, the undesirable condensation of the steam diluent must be further avoided by maintaining the temperature of the pyrolysate stream above at least about 450° C. upon contacting the spray zones. Accordingly, it is considered a critical aspect of this invention that the respective temperature limitations imposed upon the quench liquor and the pyrolysate stream as hereinabove described be maintained. It is considered preferable that the spray zones be baffled in order to guide the pyrolysate stream toward the center of the subsequent spray zones and also to agitate the vapor and liquid streams to increase the inter-dispersion thereof and thus increase diffusion. It is also important that the baffles be continuously wetted by the sprays to prevent their acting as non-wetted surfaces, i.e., sites for polymerization.

The first spray zone is essentially a heat transfer zone having, as one of its prominent functions, the task of de-superheating the high temperature pyrolysate stream. Considerable amounts of heat can be dissipated by vaporizing a portion of the quench liquor. The direct contact of the vaporous pyrolysate stream with the finely divided liquid stream from the spray gives a substantially instantaneous cooling effect. Since the spray contains quench liquor which has been recycled, as hereinafter described, and which therefore contains dissolved cyclic di-p-xylene, it is considered critical that the vaporization of the quench liquor which occurs in the first spray zone not be allowed to occur to the extent that the dissolved di-p-xylene precipitates out. There is, therefore, a further limitation imposed on the quench liquor, namely, the minimum allowable diameter of the spray droplets.

A steady state heat transfer area of a spray is directly proportional to the volumetric flow ($v$) and the residence time ($t$), and inversely proportional to the droplet diameter (D), i.e., $$S \alpha \frac{vt}{D}$$

At a given volumetric flow, the combination of the longest residence time with the smallest droplet diameter will yield the largest area. This is a desirable condition and in conventional heat transfer operations effort is directed toward maximizing the heat transfer area in just such a manner. For the recovery of di-p-xylene, however, operation of the first spray zone, i.e., the heat transfer section of the quench spray column is unique in that the limit for maximization of the heat transfer area is imposed by the process requirements. Since the spray contains recycled quench liquor containing dissolved di-p-xylene and in addition absorbs p-xylene diradicals simultaneously with the heat transfer, excessive reduction of a droplet's volume would have an adverse effect on the dimerization, i.e., a local high concentration of diradicals which could result in polymerization rather than dimerization. To avoid this, operating conditions must be maintained so that the decrease in the volume of any droplet in the first spray zone due to evaporation does not exceed a predetermined limit, governed by the concentration of di-p-xylene and the rate of absorption of diradicals.

For a given temperature differential, the amount of heat transferred to a liquid droplet is a function of the heat transfer coefficient, surface area, and the residence time, i.e., the free flight time of a droplet from a spray nozzle to the column wall. Although these parameters are in turn complex functions of such operational factors as nozzle characteristics, physical properties of the fluid, operating pressure and temperature, and the geometry of the system, an expression has been developed which approximates these relationships and provides a workable means of determining the minimum allowable droplet diameter as follows:

$$D_{min.} = \sqrt{\frac{8K(\Delta T)\theta}{\lambda \rho (1 - F^{2/3})}}$$

wherein:

$D_{min.}$ = minimum allowable droplet diameter in first spray zone
$K$ = vapor phase conducitvity of quench liquor
$\Delta T$ = temperature differential
$\theta$ = residence time
$\lambda$ = latent heat of vaporization of quench liquor
$\rho$ = density of quench liquor
$F$ = fraction of original droplet volume evaporated This relationship defines the minimum allowable droplet size in the first spray zone and thus sets the maximum limit for the steady state heat transfer area available under a given set of operating conditions. In this first spray zone, the major portion of the diradicals contained in the pyrolysate stream, i.e., about 80–90 percent, are absorbed into the quench liquor.

The second spray zone immediately following the first spray zone is essentially a mass transfer zone having, as one of its prominent functions, the task of scrubbing the pyrolysate stream to absorb therefrom substantially the remainder of the diradicals contained in said stream in order to prevent equipment fouling due to precipitation of di-p-xylene or polymer in subsequent recovery steps. In the second spray zone, the pyrolysate stream is substantially cooler than it was upon passage through the first spray zone; accordingly, evaporation is not a problem and there is no need to limit minimum droplet size in this zone. It is considered preferable to employ extremely fine spray droplets in order to maximize available mass transfer area thereby increasing the efficiency of absorption.

In addition to desuperheating the pyrolysate stream and promoting efficient absorption of the diradicals into the quench liquor, it is considered critical that conditions be maintained which enhance dimerization and impede polymer formation. The quench liquor containing the dissolved di-p-xylene and residual diradicals is passed to the quench reservoir, i.e., the terminal portion of the quench tower wherein it is retained for a period of about 0.5–3 minutes in order to enhance dimerization.

A side stream of the quench liquor containing the dissolved di-p-xylene is removed continuously from the quench reservoir and concentrated in an evaporator. The condensate from the evaporator is recycled to the quench spray zones. Depending on the p-xylene inventory in the quench, make-up p-xylene can be added to the condensate recycle stream, or some of the recycle stream can be diverted to storage. The rate of circulation of the quench liquor through the evaporation cycle is adjusted to maintain a steady state concentration of cyclic di-p-xylene in the quench liquor. The steady state concentration of di-p-xylene in the quench liquor can be held at any level not exceeding the solubility limit, i.e., about 10 percent at the operating temperature of the quench, i.e., about 110° C. Operation at high di-p-xylene concentration minimizes evaporative load in the evaporator but requires high circulating rates of the quench liquor through the spray nozzles to avoid local overconcentrations due to partial evaporation of the droplets. Operation at low concentrations of di-p-xylene increases the load on the evaporator, but makes the quench liquor circulation rate through the spray nozzles less critical. It is considered preferable that the di-p-xylene concentration in the quench liquor be maintained between about 0.5 percent to about 4 percent.

The di-p-xylene can be recovered from the evaporator concentrate by recrystallization or other similar recovery techniques. The recovered di-p-xylene can then be purified by re-dissolving it in p-xylene, decolorizing, and recrystallizing. The residual pyrolysate stream and the vaporized quench liquor can be passed from the quench tower to a subsequent condenser wherein said stream is condensed and after decantation from water, the recovered p-xylene can be recycled or stored.

The following examples are intended to be illustrative of the present invention and are not to be construed in a limiting manner.

*Example 1*

A vaporous stream of 8.2 pounds per hour of p-xylene in 190 pounds per hour of a steam diluent was fed to a high temperature pyrolytic reactor maintained at 980° C. The temperature of the effluent from the reactor, i.e., the pyrolysate stream, was immediately lowered to 600° C. by injecting low quality steam into said stream. The cooled pyrolysate stream was passed to the inlet conduit of a quench tower. The quench tower was comprised of the inlet conduit terminating in a flared downcomer, the walls of which were continuously wetted with p-xylene maintained at about 98° C., in the "dentist's bowl" arrangement discussed hereinabove. The first and second baffled spray zones which follow subsequent to the downcomer were supplied with p-xylene containing dissolved di-p-xylylene from the recycle stream. The p-xylene going to the spray zones was maintained at about 98° C. The recycle stream recirculated p-xylene containing a 3 percent steady state concentration of di-p-xylylene at a rate of 40 gallons per minute to the spray zones. The minimum diameter of the droplets in the first spray zone was fixed to allow evaporation of 25% of the droplet volume. The second spray was a fine mist. The terminal portion of the quench tower was a reservoir wherein the p-xylene containing the diradicals was retained for about 1–2 minutes, in order to favor dimerization. The residual pyrolysate stream and evaporated p-xylene was passed through a vapor port at a rate of 1000 pounds per hour p-xylene and 250 pounds per hour steam to a subsequent condenser wherein the steam and p-xylene were condensed, the water decanted and the p-xylene recycled. A portion of the recycle stream, i.e., about 110 pounds per hour of p-xylene containing dissolved di-p-xylylene, was passed to a concentration from which is subsequently recovered 0.5 pounds per hour of pure di-p-xylylene.

*Example 2*

Employing the same method described in Example 1 except that the quench liquor supplied to the spray zones was maintained at 94° C., i.e., the azeotrope temperature in the p-xylene-water system, it was found that 30 times more polymer was produced in this instance as compared to Example 1. The yield of di-p-xylylene was reduced accordingly.

What is claimed is:

1. Method for the preparation of cyclic di-p-xylylene which comprises:
   (a) cooling a stream containing steam and p-xylylene radicals to a temperature between about 450° C. and about 800° C.;
   (b) thermally and physically isolating said stream from non-wetted surfaces maintained at temperatures below about 350° C.;
   (c) absorbing a substantial portion of the p-xylylene diradicals from said stream by contacting said stream in a first spray zone with a spray of a quench liquor containing a solvent for the p-xylylene diradicals wherein said diradicals can dimerize to the cyclic dimer, di-p-xylylene, said quench liquor maintained at a temperature above the condensation temperature of the steam in said stream;
   (d) desuperheating said stream in said first spray zone by contacting said stream with said spray of quench liquor and vaporizing a portion of said quench liquor spray without excessive reduction of spray volume;
   (e) further contacting the effluent from said first spray zone with a fine spray of said quench liquor in a second spray zone, said quench liquor maintained at a temperature above the condensation temperature of the steam in said stream under conditions sufficient to remove substantially all of the residual p-xylylene diradicals from said stream;
   (f) maintaining all surfaces in said first and second spray zones wet with said quench liquor;
   (g) separating the quench liquor from the effluent from said second spray zone and recovering the cyclic di-p-xylylene from said quench liquor.

2. Method for the preparation of cyclic di-p-xylylene which comprises:
   (a) cooling a stream containing steam and p-xylylene radicals from temperatures between about 800° C. to 1000° C. to a temperature between about 450° C. and about 800° C.;
   (b) thermally and physically isolating said stream in a continuous fluid film barrier from non-wetted surfaces maintained at temperatures below about 350° C.;
   (c) absorbing a substantial portion of the p-xylylene diradicals from said stream by contacting said stream in a first baffled spray zone with a spray of quench liquor containing an inert organic solvent for the p-xylylene diradicals wherein said diradicals can dimerize to the cyclic dimer, di-p-xylylene, said quench liquor maintained at a temperature above the condensation temperature of the steam in said stream;
   (d) desuperheating said stream in said first baffled spray zone by contacting said stream with said spray of quench liquor and vaporizing a portion of said quench liquor spray without excessive reduction of spray volume;
   (e) further contacting the effluent from said first spray zone with a fine spray of said quench liquor in a second baffled spray zone, said quench liquor maintained at a temperature above the condensation temperature of the steam in said stream under conditions sufficient to remove substantially all of the residual p-xylylene diradicals from said stream;
   (f) maintaining all surfaces in said first and second baffled spray zones wet with said quench liquor;
   (g) separating the quench liquor from the effluent from said second baffled spray zone and recovering the cyclic di-p-xylylene from a portion of said quench liquor and recycling the remainder of said quench liquor to said first and second spray zones.

3. Method for the preparation of cyclic di-p-xylylene as defined in claim 2 wherein the continuous fluid film barrier employed to isolate the stream from non-wetted surfaces is comprised of a constant flow of quench liquor.

4. Method for the preparation of cyclic di-p-xylylene as defined in claim 3 wherein the quench liquor is maintained at a temperature above the condensation temperature of the steam in the stream.

5. Method for the preparation of cyclic di-p-xylylene as defined in claim 2 wherein the continuous fluid film barrier employed to isolated the stream from non-wetted surfaces is comprised of a constant flow of transpired purge steam.

6. Method for the preparation of cyclic di-p-xylylene as defined in claim 2 wherein the steady state concentration of di-p-xylylene in the quench liquor recycled to the spray zones is up to about 10 percent at the operating temperatures of the spray zones.

7. Method for the preparation of cyclic di-p-xylylene as defined in claim 6 wherein the steady state concentration of di-p-xylylene in the recycle stream is between about 0.5 to 4 percent.

8. Method for the preparation of cyclic di-p-xylylene which comprises:
   (a) cooling a stream containing steam and p-xylylene radicals from temperatures between about 900° C. to 1000° C. to a temperature between about 450° C. to about 800° C.;

(b) thermally and physically isolating said stream in a continuous fluid film barrier from non-wetted surfaces maintained at temperatures below about 350° C.;
(c) absorbing a substantial portion of the p-xylylene diradicals from said stream by contacting said stream in a first baffled spray zone with a spray of a quench liquor containing an inert organic solvent for the p-xylylene diradicals wherein said diradicals can dimerize to the cyclic dimer, di-p-xylylene, said quench liquor maintained at a temperature above the condensation temperature of the steam in said stream;
(d) desuperheating said stream in said first baffled spray zone by contacting said stream with said spray of quench liquor and vaporizing a portion of said quench liquor spray, the minimum allowable diameter of the respective droplets in said spray being determined by the relationship:

$$D_{min.} = \sqrt{\frac{8K(\Delta T)\theta}{\lambda\rho(1-F^{2/3})}}$$

wherein:

$D_{min.}$ = minimum allowable droplet diameter in first spray zone
$K$ = vapor phase conductivity of quench liquor
$\Delta T$ = temperature differential
$\theta$ = residence time
$\lambda$ = latent heat of vaporization of quench liquor
$\rho$ = density of quench liquor
$F$ = fraction of original droplet volume evaporated;

(e) further contacting the effluent from said first spray zone with a fine spray of said quench liquor in a second baffled spray zone, said quench liquor maintained at a temperature above the condensation temperature of the steam in said stream under conditions sufficient to remove substantially all of the residual p-xylylene diradicals from said stream;
(f) maintaining all surfaces in said first and second baffled spray zones wet with said quench liquor;
(g) separating the quench liquor containing the dissolved p-xylylene diradicals from the stream containing steam and vaporized quench liquor;
(h) retaining the quench liquor containing the dissolved p-xylylene diradicals in a terminal reservoir zone for a period of from about 0.5 to 3 minutes to enhance dimerization;
(i) recovering the cyclic di-p-xylylene from a portion of the quench liquor and recycling the remainder of said quench liquor to the spray zones.

9. Method for the preparation of cyclic di-p-xylylene which comprises:
(a) rapidly cooling a stream containing steam and p-xylylene radicals from temperatures between about 900° C. to 1000° C. to a temperature between about 450° C. to about 800° C.;
(b) thermally and physically isolating said stream in a continuous fluid film barrier from non-wetted surfaces maintained at temperatures below about 350° C.;
(c) absorbing a substantial portion of the p-xylylene diradicals from said stream by contacting said stream in a first baffled spray zone with a spray of p-xylene maintained at a temperature about 94° C. wherein said diradicals can dimerize to the cyclic dimer, di-p-xylylene;
(d) desuperheating said stream in said first baffled spray zone by contacting said stream with said spray of p-xylene and vaporizing a portion of said p-xylene spray, the minimum allowable diameter of the respective droplets in said spray being determined by the relationship:

$$D_{min.} = \sqrt{\frac{8K(\Delta T)\theta}{\lambda\rho(1-F^{2/3})}}$$

wherein:

$D_{min.}$ = minimum allowable droplet diameter
$K$ = vapor phase conductivity of quench liquor
$T$ = temperature differential
$\theta$ = residence time
$\lambda$ = latent heat of vaporization of quench liquor
$\rho$ = density of quench liquor
$F$ = fraction of original droplet volume evaporated, (e) further contacting the effluent from said first spray zone with a fine spray of said p-xylene in a second baffled spray zone, said p-xylene maintained at a temperature above 94° C. under conditions sufficient to remove substantially all of the residual p-xylylene diradicals from said stream;
(f) maintaining all surfaces in said first and second baffled spray zones wet with said p-xylene;
(g) separating the p-xylene containing the dissolved p-xylylene diradicals from the stream containing steam and vaporized p-xylene;
(h) retaining the p-xylene containing the dissolved p-xylylene diradicals in a terminal reservoir zone for a period of from about 0.5 to 3 minutes to enhance dimerization;
(i) recovering the cyclic di-p-xylylene from a portion of the p-xylene and recycling the remainder of said p-xylene to the spray zones.

10. Method for the preparation of cyclic di-p-xylylene as defined in claim 9 wherein the continuous fluid film barrier employed to isolate the stream from non-wetted surfaces is comprised of a constant flow of p-xylene which is substantially free of dissolved di-p-xylylene.

11. Method for the preparation of cyclic di-p-xylylene as defined in claim 9 wherein the p-xylene is maintained at temperatures sufficient to preclude condensation of steam from the stream.

12. Method for the preparation of cyclic di-p-xylylene as defined in claim 9 wherein the continuous fluid film barrier employed to isolate the stream from non-wetted surfaces is comprised of a constant flow of transpired purge steam.

13. Method for the preparation of cyclic di-p-xylylene as defined in claim 9 wherein the steady state concentration of di-p-xylylene in the p-xylene recycled to the spray zones is up to about 10 percent at the operating temperatures of the spray zones.

14. Method for the preparation of cyclic di-p-xylylene as defined in claim 13 wherein the steady state concentration of di-p-xylylene in the recycle stream is between about 0.5 to 4 percent.

References Cited by the Examiner

UNITED STATES PATENTS 3,149,175  9/1964  Pollart _____ 260—670

DELBERT E. GANTZ, *Primary Examiner.*

G. E. SCHMITKONS, *Assistant Examiner.*